(12) United States Patent
Peng et al.

(10) Patent No.: US 11,345,814 B2
(45) Date of Patent: May 31, 2022

(54) POLY(PHENYLENE ETHER) COMPOSITION AND JACKETED CABLE COMPRISING SAME

(71) Applicant: SABIC GLOBAL TECHNOLOGIES B.V., Bergen op Zoom (NL)

(72) Inventors: Hui Peng, Shanghai (CN); Wei Shan, Shanghai (CN); Shen Zhang, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 946 days.

(21) Appl. No.: 16/078,132

(22) PCT Filed: Feb. 29, 2016

(86) PCT No.: PCT/CN2016/074795
§ 371 (c)(1),
(2) Date: Aug. 21, 2018

(87) PCT Pub. No.: WO2017/147737
PCT Pub. Date: Sep. 8, 2017

(65) Prior Publication Data
US 2021/0189119 A1 Jun. 24, 2021

(51) Int. Cl.
*C08L 71/12* (2006.01)
*H01B 3/42* (2006.01)
*H01B 7/295* (2006.01)

(52) U.S. Cl.
CPC .......... *C08L 71/123* (2013.01); *H01B 3/427* (2013.01); *H01B 7/295* (2013.01); *C08L 2205/025* (2013.01); *C08L 2205/035* (2013.01)

(58) Field of Classification Search
CPC .. C08K 5/0066; C08K 5/3475; C08K 5/5313; C08L 2205/025; C08L 2205/035; C08L 23/02; C08L 23/06; C08L 23/12; C08L 53/025; C08L 71/12; C08L 71/123; C08L 83/12; C08L 9/06; C09D 183/12;
(Continued)

(56) References Cited

U.S. PATENT DOCUMENTS 4,681,905 A 7/1987 Kubota et al.
4,937,348 A 6/1990 Kubota
(Continued)

FOREIGN PATENT DOCUMENTS

CN 102337017 A * 2/2012 ............. C08K 13/02
JP 10138435 A * 5/1998 ............. B32B 27/18
(Continued)

OTHER PUBLICATIONS

Chiguard 5431 Datasheet_pp. 1-3_Sep. 2006.*
(Continued)

*Primary Examiner* — Timothy J Thompson
*Assistant Examiner* — Guillermo J Egoavil
(74) *Attorney, Agent, or Firm* — Cantor Colburn LLP

(57) ABSTRACT

A composition includes specific amounts of a poly (phenylene ether), a hydrogenated block copolymer of an alkenyl aromatic monomer and a conjugated diene, a polypropylene, a polybutene, a flame retardant, and an ultraviolet absorbing agent comprising a bis(benzotriazole) compound. The composition is particularly useful for forming the jacket layer of electrical and optical cables.

14 Claims, 1 Drawing Sheet

(58) Field of Classification Search
CPC .......... H01B 3/427; H01B 3/42; H01B 3/441;
H01B 7/295
USPC .................................................. 174/110 A
See application file for complete search history.

(56) References Cited

U.S. PATENT DOCUMENTS

| | | | |
|---|---|---|---|
| 5,229,521 | A | 7/1993 | Luisoli et al. |
| 5,237,071 | A | 8/1993 | Leistner et al. |
| 7,655,714 | B2 | 2/2010 | Qiu et al. |
| 7,795,537 | B2 | 9/2010 | Mhetar et al. |
| 8,017,697 | B2 | 9/2011 | Carrillo et al. |
| 8,669,332 | B2 | 3/2014 | Carrillo et al. |
| 2008/0114102 | A1 | 5/2008 | Balfour et al. |
| 2009/0084577 | A1 | 4/2009 | Qiu et al. |
| 2009/0133896 | A1 | 5/2009 | Kosaka et al. |
| 2010/0139944 | A1 | 6/2010 | Guo et al. |
| 2013/0253105 | A1 | 9/2013 | Shan |
| 2015/0252214 | A1 | 9/2015 | Shan |

FOREIGN PATENT DOCUMENTS

| | | | | | |
|---|---|---|---|---|---|
| JP | | 11320798 | A * | 11/1999 | ............. B32B 27/18 |
| WO | | 2009042369 | A2 | 4/2009 | |
| WO | WO-2010030478 | A2 * | 3/2010 | ............. C08J 3/226 |
| WO | | 2014075291 | A1 | 5/2014 | |
| WO | WO-2014075291 | A * | 5/2014 | ............... C08K 3/22 |
| WO | WO-2016009939 | A1 * | 1/2016 | ............. C08G 77/24 |

OTHER PUBLICATIONS

International Search Report for Intenational Application No. PCT/CN2016/074795, International Filing Date Feb. 29, 2016, dated Nov. 15, 2016, 8 pages.

Written Opinion for Intenational Application No. PCT/CN2016/074795, International Filing Date Feb. 29, 2016, dated Nov. 15, 2016, 5 pages.

* cited by examiner

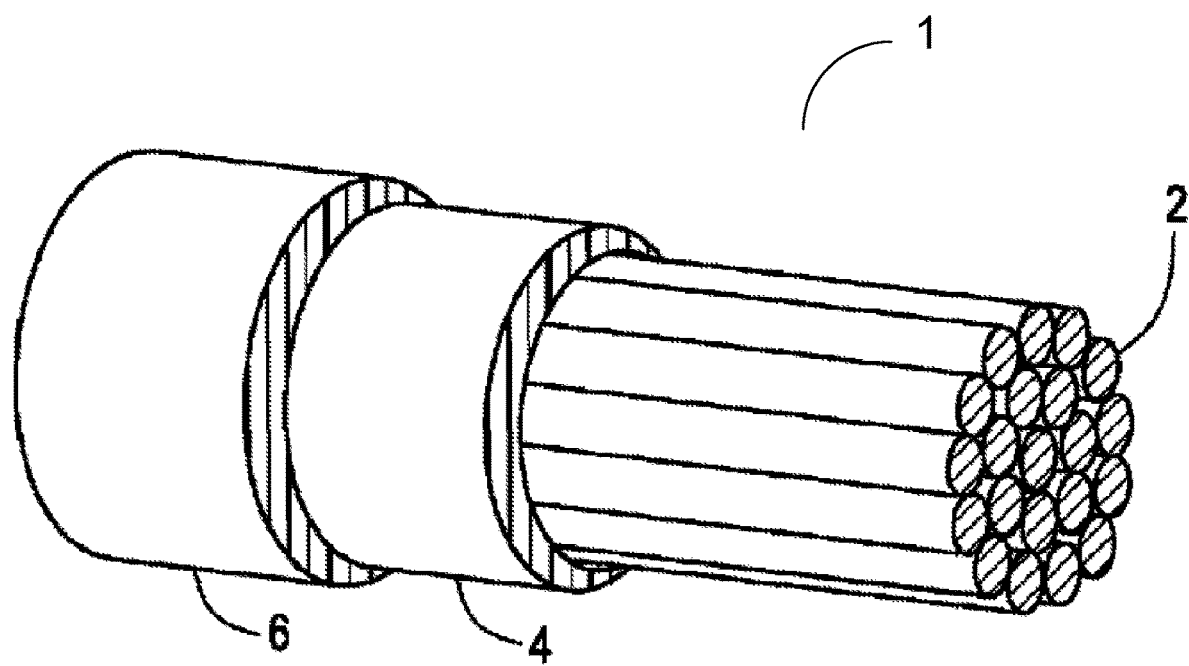

POLY(PHENYLENE ETHER) COMPOSITION AND JACKETED CABLE COMPRISING SAME

CROSS REFERENCE TO RELATED APPLICATIONS

This application is a National Stage application of PCT/CN2016/074795, filed Feb. 29, 2016, which is incorporated by reference in its entirety herein.

BACKGROUND OF THE INVENTION

In the consumer electronics market, jacketed cables are widely used to transfer data to and from devices, and to charge the batteries of devices. Devices are often sold in a variety of colors, with matching colored cables. Jacketing compositions containing poly(phenylene ether)s are known to perform well in many ways, including flexibility, heat resistance, flame retardancy, colorability, and little or no halogen content. However, light-colored versions of these compositions can exhibit undesirable color changes (e.g., yellowing) on exposure to ultraviolet radiation. And while the incorporation of ultraviolet absorbers to such compositions can reduce unwanted color changes, relatively high concentrations of the ultraviolet absorbers can be required and be accompanied by unwanted migration of the ultraviolet absorber to the surface of a cable. There remains a need for light-colored poly(phenylene ether)-containing compositions that exhibit stability to ultraviolet radiation while incorporating a reduced amount of ultraviolet absorber.

BRIEF SUMMARY OF EMBODIMENTS OF THE INVENTION

One embodiment is a composition, comprising: 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

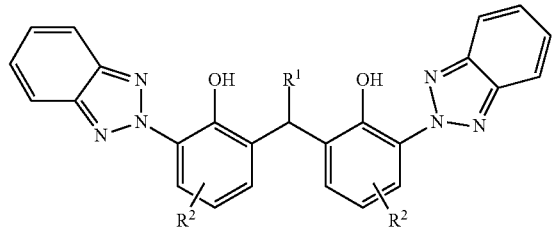

wherein $R^1$ is hydrogen or methyl; and each occurrence of $R^2$ is independently $C_4$-$C_{12}$ alkyl; wherein all parts by weight are based on 100 parts by weight total of the poly(phenylene ether), the hydrogenated block copolymer, the polypropylene, the polybutene, and the flame retardant.

Another embodiment is a jacketed cable comprising a conductor, a covering surrounding the conductor, and a jacket surrounding the covering, wherein the jacket comprises a composition comprising: 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

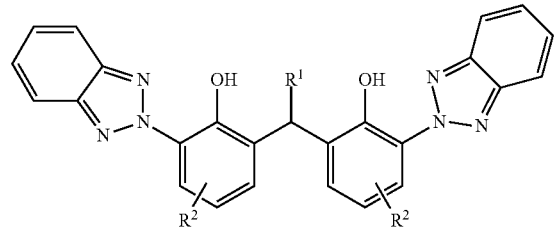

wherein $R^1$ is hydrogen or methyl; and each occurrence of $R^2$ is independently $C_4$-$C_{12}$ alkyl; wherein all parts by weight are based on 100 parts by weight total of the poly(phenylene ether), the hydrogenated block copolymer, the polypropylene, the polybutene, and the flame retardant.

These and other embodiments are described in detail below.

BRIEF DESCRIPTION OF THE FIGURE

The FIGURE depicts a jacketed cable 1 comprising a conductor 2, a covering 4 surrounding the conductor, and a jacket 6 surrounding the covering.

DETAILED DESCRIPTION OF THE INVENTION

The present inventors have determined that a specific poly(phenylene ether) composition incorporating a particular bis(benzotriazole) compound as an ultraviolet absorber provides flexibility and good ultraviolet stability even when the composition is light-colored and a small amount of the ultraviolet absorber is used.

One embodiment is a composition comprising 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

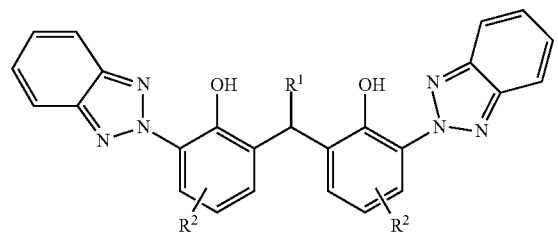

wherein $R^1$ is hydrogen or methyl; and each occurrence of $R^2$ is independently $C_4$-$C_{12}$ alkyl; wherein all parts by weight are based on 100 parts by weight total of the poly(phenylene ether), the hydrogenated block copolymer, the polypropylene, the polybutene, and the flame retardant.

The composition comprises a poly(phenylene ether). Poly (phenylene ether)s include those comprising repeating structural units having the formula

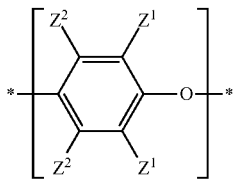

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof.

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

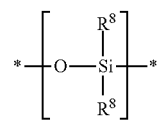

wherein each occurrence of $R^8$ is independently hydrogen, $C_1$-$C_{12}$ hydrocarbyl or $C_1$-$C_{12}$ halohydrocarbyl; and two terminal units having the structure

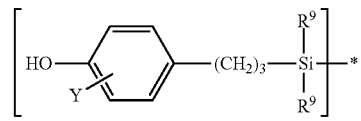

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxy.

In some embodiments, the monohydric phenol comprises 2,6-dimethylphenol, and the hydroxyaryl-terminated polysiloxane has the structure

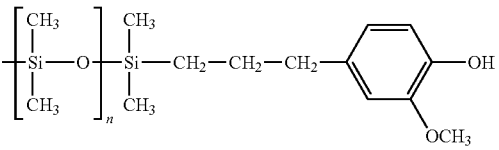

wherein n is, on average, 5 to 100, or 30 to 60.

The oxidative copolymerization method produces poly (phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. Nos. 8,017,697 and 8,669,332 to Carrillo et al.

In some embodiments, the poly(phenylene ether) has an intrinsic viscosity of 0.25 to 1 deciliter per gram measured by Ubbelohde viscometer at 25° C. in chloroform. Within this range, the poly(phenylene ether) intrinsic viscosity can be 0.3 to 0.65 deciliter per gram, or 0.35 to 0.5 deciliter per gram, or 0.4 to 0.5 deciliter per gram. In some embodiments, the poly(phenylene ether) is a poly(2,6-dimethyl-1,4-phenylene ether) having an intrinsic viscosity of 0.35 to 0.5 deciliter per gram. In some embodiments, the poly(phenylene ether) has an intrinsic viscosity of 0.35 to 0.5 deciliter per gram and comprises poly(phenylene ether) homopolymer and poly(phenylene ether)-polysiloxane block copolymer.

In some embodiments, the poly(phenylene ether) comprises a homopolymer or copolymer of monomers selected from the group consisting of 2,6-dimethylphenol, 2,3,6-trimethylphenol, and combinations thereof. In some embodiments, the poly(phenylene ether) comprises a poly(phenylene ether)-polysiloxane block copolymer. In these embodiments, the poly(phenylene ether)-polysiloxane block copolymer can, for example, contribute 0.05 to 2 weight percent, or 0.1 to 1 weight percent, or 0.2 to 0.8 weight percent, of siloxane groups to the composition as a whole.

Suitable poly(phenylene ether) homopolymers are commercially available as, for example, PPO™ 640 and 646 from SABIC, and XYRON™ S201A and S202A from Asahi Kasei Chemicals Corporation.

The composition comprises the poly(phenylene ether) in an amount of 15 to 40 parts by weight, based on 100 parts by weight total of the poly(phenylene ether), the hydrogenated block copolymer, the polypropylene, the polybutene, and the flame retardant. Within this range, the poly(phenylene ether) amount can be 20 to 35 parts by weight, or 20 to 30 parts by weight, or 22 to 28 parts by weight, or 23 to 28 parts by weight.

In addition to the poly(phenylene ether), the composition comprises a hydrogenated block copolymer of an alkenyl aromatic monomer and a conjugated diene. For brevity, this component is referred to as the "hydrogenated block copolymer". The hydrogenated block copolymer can comprise 10 to 90 weight percent of poly(alkenyl aromatic) content and 90 to 10 weight percent of hydrogenated poly(conjugated diene) content, based on the weight of the hydrogenated block copolymer. In some embodiments, the hydrogenated block copolymer is a low poly(alkenyl aromatic content) hydrogenated block copolymer in which the poly(alkenyl aromatic) content is 10 to less than 40 weight percent, or 20 to 35 weight percent, or 25 to 35 weight percent, or 30 to 35 weight percent, all based on the weight of the low poly(alkenyl aromatic) content hydrogenated block copolymer. In other embodiments, the hydrogenated block copolymer is a high poly(alkenyl aromatic content) hydrogenated block copolymer in which the poly(alkenyl aromatic) content is 40 to 90 weight percent, or 50 to 80 weight percent, or 60 to 70 weight percent, all based on the weight of the high poly(alkenyl aromatic content) hydrogenated block copolymer.

In some embodiments, the hydrogenated block copolymer has a weight average molecular weight of 40,000 to 400,000 atomic mass units. The number average molecular weight and the weight average molecular weight can be determined by gel permeation chromatography and based on comparison to polystyrene standards. In some embodiments, the hydrogenated block copolymer has a weight average molecular weight of 200,000 to 400,000 atomic mass units, or 220,000 to 350,000 atomic mass units. In other embodiments, the hydrogenated block copolymer has a weight average molecular weight of 40,000 to 200,000 atomic mass units, or 40,000 to 180,000 atomic mass units, or 40,000 to 150,000 atomic mass units.

The alkenyl aromatic monomer used to prepare the hydrogenated block copolymer can have the structure

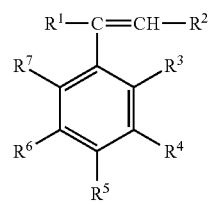

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, methylstyrenes such as alpha-methylstyrene and p-methylstyrene, and t-butylstyrenes such as 3-t-butylstyrene and 4-t-butylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene is 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a (B) block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of (A) and (B), wherein the molecular weight of each (A) block can be the same as or different from that of other (A) blocks, and the molecular weight of each (B) block can be the same as or different from that of other (B) blocks. In some embodiments, the hydrogenated block copolymer is a diblock copolymer, a triblock copolymer, or a combination thereof.

In some embodiments, the hydrogenated block copolymer comprises a polystyrene-poly(ethylene-butylene-styrene)-polystyrene tapered block copolymer. For brevity, this component is referred to as the "tapered block copolymer". In some embodiments, the tapered block copolymer has a polystyrene content of 30 to 70 weight percent, or 35 to 65 weight percent, based on the weight of the tapered block copolymer. In some embodiments, the tapered block copolymer has a melt flow rate of 0 to 10 grams per 10 minutes, measured at 260° C. and 5 kilogram load according to ASTM D1238-13. Tapered block copolymers are commercially available as, for example, KRATON™ A1535 and A1536 Resins from Kraton Performance Polymers.

The hydrogenated block copolymer can consist of the tapered block copolymer. Alternatively, the hydrogenated block copolymer can comprise a polystyrene-poly(ethylene-butylene)-polystyrene triblock copolymer, and the tapered block copolymer. For example, the 25 to 45 parts by weight of the hydrogenated block copolymer can comprise 3 to 12 parts by weight of a polystyrene-poly(ethylene-butylene)-polystyrene triblock copolymer and 22 to 35 parts by weight of the tapered block copolymer. In still other embodiments, the hydrogenated block copolymer can consist of the polystyrene-poly(ethylene-butylene)-polystyrene triblock copolymer.

In some embodiments, the hydrogenated block copolymer excludes the residue of monomers other than the alkenyl aromatic compound and the conjugated diene. In some embodiments, the hydrogenated block copolymer consists of blocks derived from the alkenyl aromatic compound and the conjugated diene. It does not comprise grafts formed from these or any other monomers. It also consists of carbon and hydrogen atoms and therefore excludes heteroatoms. In some embodiments, the hydrogenated block copolymer includes the residue of one or more acid functionalizing agents, such as maleic anhydride.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Performance Polymers Inc. as KRATON™ G1701 (having about 37 weight percent polystyrene) and G1702 (having about 28 weight percent polystyrene); the polystyrene-poly(ethylene-butylene)-polystyrene triblock copolymers available from Kraton Performance Polymers Inc. as KRATON™ G1641 (having about 33 weight percent polystyrene), G1650 (having about 30 weight percent polystyrene), G1651 (having about 33 weight percent polystyrene), and G1654 (having about 31 weight percent polystyrene); and the polystyrene-poly(ethylene-ethylene/propylene)-polystyrene triblock copolymers available from Kuraray as SEPTON™ S4044, S4055, S4077, and S4099. Additional commercially available hydrogenated block copolymers include polystyrene-poly(ethylene-butylene)-polystyrene (SEBS) triblock copolymers available from Dynasol as CALPRENE™ H6140 (having about 31 weight percent polystyrene), H6170 (having about 33 weight percent polystyrene), H6171 (having about 33 weight percent polystyrene), and H6174 (having about 33 weight percent polystyrene), and from Kuraray as SEPTON™ 8006 (having about 33 weight percent polystyrene) and 8007 (having about 30 weight percent polystyrene); polystyrene-poly(ethylene-butylene-styrene)-polystyrene tapered block copolymers available from Kraton Performance Polymers as KRATON™ A1535 (having 56.3-60.3 weight percent polystyrene) and A1536 (having 37-44 weight percent polystyrene); polystyrene-poly(ethylene-propylene)-polystyrene (SEPS) copolymers available from Kuraray as SEPTON™ 2006 (having about 35 weight percent polystyrene) and 2007 (having about 30 weight percent polystyrene); and oil-extended compounds of these hydrogenated block copolymers available from Kraton Performance Polymers Inc. as KRATON™ G4609 (containing about 45% mineral oil, and the SEBS having about 33 weight percent polystyrene) and G4610 (containing about 31% mineral oil, and the SEBS having about 33 weight percent polystyrene); and from Asahi as TUFTEC™ H1272 (containing about 36% oil, and the SEBS having about 35 weight percent polystyrene). Mixtures of two or more hydrogenated block copolymers can be used.

The composition comprises the hydrogenated block copolymer in an amount of 25 to 45 parts by weight, based on 100 parts by weight total of the poly(phenylene ether), the hydrogenated block copolymer, the polypropylene, the polybutene, and the flame retardant. Within this range, the hydrogenated block copolymer amount can be 32 to 44 parts by weight, or 33 to 43 parts by weight.

In addition to the poly(phenylene ether) and the hydrogenated block copolymer, the composition comprises a polypropylene. As used herein, the term "polypropylene" refers to a propylene homopolymer. The polypropylene can be atactic, syndiotactic, isotactic, or a combination thereof. In some embodiments, the polypropylene is an atactic polypropylene having a melt flow rate of 4 to 16 grams per 10 minutes, or 5 to 12 grams per 10 minutes, measured at 230° C. and 2.16 kilogram load according to ASTM D1238-13.

Suitable polypropylenes are commercially available as, for example, PP 570P Resin from SABIC, and PP1304E3 Resin from ExxonMobil.

The composition comprises the polypropylene in an amount of 5 to 15 parts by weight, based on 100 parts by weight total of the poly(phenylene ether), the hydrogenated block copolymer, the polypropylene, the polybutene, and the flame retardant. Within this range, the polypropylene amount can be 7 to 14 parts by weight, or 8 to 13 parts by weight.

In addition to the poly(phenylene ether), the hydrogenated block copolymer, and the polypropylene, the composition comprises a polybutene having a number average molecular weight of 500 to 1500 grams/mole. As used herein, the term "polybutene" refers to a polymer comprising at least 75 weight percent of units, or at least 80 weight percent of units, derived from 1-butene, 2-butene, 2-methylpropene (isobutene), or a combination thereof. The polybutene may be a homopolymer or a copolymer. In some embodiments, the polybutene consists of units derived from 1-butene, 2-butene, 2-methylpropene (isobutene), or a combination thereof. In other embodiments, the polybutene is a copolymer that comprises 1 to 25 weight percent of repeat units derived from a copolymerizable monomer such as ethylene, propylene, or 1-octene. In some embodiments, the polybutene is a homopolymer of 2-methylpropene. In other embodiments, the polybutene is a copolymer of 2-methylpropene with 1-butene and/or 2-butene. In still other embodiments, the polybutene is a combination of a homopolymer of 2-methylpropene, and a copolymer of 2-methylpropene with 1-butene and/or 2-butene.

The polybutene has a number average molecular weight of 500 to 1500 grams/mole. Number average molecular weight can be determined by gel permeation chromatography using polystyrene standards. Within the range of 500 to 1500 grams/mole, the number average molecular weight can be 600 to 1400 grams/mole, or 600 to 1200 grams/mole.

Suitable polybutenes are commercially available as, for example, INDOPOL™ H-50 Resin from INEOS, and PB800 Resin from Daelim Industrial Co. Ltd.

The composition comprises the polybutene in an amount of 5 to 15 parts by weight based on 100 parts by weight total of the poly(phenylene ether), the hydrogenated block copolymer, the polypropylene, the polybutene, and the flame retardant. Within this range, the polybutene amount can be 5 to 14 parts by weight, or 6 to 12 parts by weight.

In addition to the poly(phenylene ether), the hydrogenated block copolymer, the polypropylene, and the polybutene, the composition comprises a flame retardant comprising aluminum tris(diethyl phosphinate) and melamine polyphosphate. In some embodiments, flame retardant consists of aluminum tris(diethyl phosphinate) and melamine polyphosphate. In other embodiments, the flame retardant further comprises an organophosphate ester (such as resorcinol bis(diphenyl phosphate) or bisphenol A bis(diphenyl phosphate)), an oligomeric or polymeric bis(phenoxy)phosphazene (such as a linear and cyclic bis(phenoxy)phosphazene), a metal borate (such as zinc borate), a metal hydroxide (such as magnesium dihydroxide, aluminum trihydroxide, or cobalt dihydroxide), melamine cyanurate, or a combination of two or more of the foregoing.

The composition comprises the flame retardant in an amount of 15 to 25 parts by weight, based on 100 parts by weight total of the poly(phenylene ether), the hydrogenated block copolymer, the polypropylene, the polybutene, and the flame retardant. Within this range, the flame retardant amount can be 15 to 24 parts by weight, or 16 to 23 parts by weight. In some embodiments, the flame retardant comprises 7 to 17 parts by weight of the aluminum tris(diethyl phosphinate) and 7 to 17 of the melamine polyphosphate, or 7 to 13 parts by weight of the aluminum tris(diethyl phosphinate) and 7 to 13 of the melamine polyphosphate, provided that the total flame retardant amount is 15 to 25 parts by weight.

In addition to the poly(phenylene ether), the hydrogenated block copolymer, the polypropylene, the polybutene, and the flame retardant, the composition comprises an ultraviolet absorbing agent comprising a bis(benzotriazole) compound having the structure

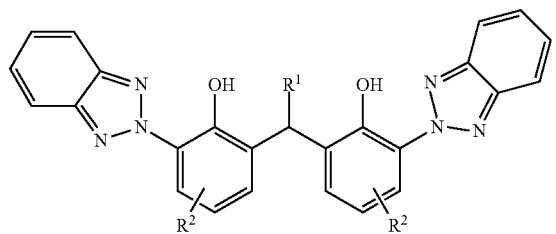

wherein $R^1$ is hydrogen or methyl; and each occurrence of $R^2$ is independently $C_4$-$C_{12}$ alkyl. In some embodiments, $R^1$ is hydrogen. In some embodiments, each occurrence of $R^2$ is independently $C_6$-$C_{10}$ alkyl. In some embodiments, $R^1$ is hydrogen, and each occurrence of $R^2$ is independently $C_6$-$C_{10}$ alkyl. In some embodiments, the bis(benzotriazole) compound is 2,2'-methylene bis[4-(1,1,3,3-tetramethylbutyl)-6-(2H-benzotriazole-2-yl)phenol], CAS Reg. No. 103597-45-1.

Procedures for the synthesis of bis(benzotriazole) compounds having the structure above are known and include, for example, those described in U.S. Pat. Nos. 4,681,905 and 4,937,348 to Kubota et al., U.S. Pat. No. 5,229,521 to Luisoli et al., and U.S. Pat. No. 5,237,071 to Leistner et al. Bis(benzotriazole) compounds are also commercially available as, for example, TINUVIN™ 360 from BASF, LA-31RG from Amfine Chemical Corporation, and CHIGUARD™ 5431 from Chitec.

In some embodiments, the ultraviolet absorbing agent consists of the bis(benzotriazole) compound. In other embodiments, the ultraviolet absorbing agent further comprises a benzotriazole ultraviolet absorbing agent other than the bis(benzotriazole) compound, a triazine ultraviolet absorbing agent, a benzophenone ultraviolet absorbing agent, or a combination of at least two of the foregoing.

The composition comprises the ultraviolet absorbing agent in an amount of 1 to 5 parts by weight, based on 100 parts by weight total of the poly(phenylene ether), the hydrogenated block copolymer, the polypropylene, the polybutene, and the flame retardant. Within this range, the ultraviolet absorbing agent amount can be 1.6 to 4 parts by weight, or 2 to 3 parts by weight.

The composition can, optionally, further include mineral oil. When present, mineral oil can be used in an amount of 1 to 15 parts by weight, or 4 to 12 parts by weight, based on 100 parts by weight total of the poly(phenylene ether), the hydrogenated block copolymer, the polypropylene, the polybutene, and the flame retardant.

The composition can, optionally, further include a colorant. Colorants include dyes and pigments. Suitable colorants include, for example, titanium dioxide, carbon black, disperse orange 47, pigment blue 15:4, pigment blue 29, pigment brown 24, pigment red 101, pigment red 149, pigment yellow 119, solvent blue 104, solvent green 3, solvent red 52, and combinations thereof. When present, colorant can be used in an amount of 0.001 to 15 parts by weight, or 1 to 14 parts by weight, based on 100 parts by weight total of the poly(phenylene ether), the hydrogenated block copolymer, the polypropylene, the polybutene, and the flame retardant.

The composition can, optionally, further comprise one or more additives known in the thermoplastics art. For example, the composition can, optionally, further comprise an additive selected from the group consisting of stabilizers, mold release agents, lubricants, processing aids, drip retardants, antioxidants, anti-static agents, metal deactivators, and combinations thereof. When present, such additives are typically used in a total amount of less than or equal to 5 parts by weight, or less than or equal to 4 parts by weight, more or less than or equal to 3 parts by weight, based on 100 parts by weight total of the poly(phenylene ether), the hydrogenated block copolymer, the polypropylene, the polybutene, and the flame retardant. In some embodiments, the composition comprises 0 to 1 part by weight, or 0 to 0.5 part by weight, or 0.05 to 0.2 part by weight of metal deactivator, based on 100 parts by weight total of the poly(phenylene ether), the hydrogenated block copolymer, the polypropylene, the polybutene, and the flame retardant.

In some embodiments, the composition further comprises 0 to 15 parts by weight mineral oil and 0 to 15 parts by weight colorant, and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

In a very specific embodiment, the composition comprises 22 to 28 parts by weight of the poly(phenylene ether), 33 to 43 parts by weight of the hydrogenated block copolymer, 4 to 9 parts by weight of the polypropylene, 5 to 11 parts by weight of the polybutene, 15 to 22 parts by weight of the flame retardant, and 1.5 to 4 parts by weight of the ultraviolet absorbing agent. Optionally in this embodiment, the poly(phenylene ether) is a poly(2,6-dimethyl-1,4-phenylene ether) having an intrinsic viscosity of 0.35 to 0.5 deciliter per gram; the 33 to 43 parts by weight of the hydrogenated block copolymer comprises 27 to 37 parts by weight of a polystyrene-poly(ethylene-butylene-styrene)-polystyrene tapered block copolymer; the composition comprises 0 to 5 parts by weight of any polyolefin other than the polypropylene and the polybutene; the flame retardant consists of the aluminum tris(diethyl phosphinate) and the melamine polyphosphate; in the bis(benzotriazole) compound structure, $R^1$ is hydrogen, and each occurrence of $R^2$ is independently $C_6$-$C_1$ alkyl; and the composition comprises 0 to 5 parts by weight total of any components other than the poly(phenylene ether), the hydrogenated block copolymer, the polypropylene, the polybutene, the flame retardant, and the ultraviolet absorbing agent.

The composition can, optionally, minimize or exclude components other than those described above. For example, in some embodiments, the composition comprises 0 to 5 parts by weight total, or 0 to 4 parts by weight total, of polyolefins other than the polypropylene and the polybutene, wherein parts by weight are based on 100 parts by weight total of the poly(phenylene ether), the hydrogenated block copolymer, the polypropylene, the polybutene, and the flame retardant. As another example, in some embodiments, the composition comprises 0 to 5 parts by weight total, or 0 to 3 parts by weight total, or 0 parts by weight total, of homopolystyrenes, rubber-modified polystyrenes, and polyamides, wherein parts by weight are based on 100 parts by weight total of the poly(phenylene ether), the hydrogenated block copolymer, the polypropylene, the polybutene, and the flame retardant.

The composition is particularly useful when formulated to provide a light color, because light-colored poly(phenylene ether) compositions are most susceptible to color change on ultraviolet exposure. Thus, in some embodiments, the composition exhibits a lightness value, L*, of at least 60, or 60 to 95, or 70 to 90, or 75 to 90, measured according to ASTM D2244-15a using a D65 standard illuminant. In some embodiments, the composition exhibits a lightness value, L*, of at least 60, and a color change, Delta E*$_{ab}$, less than or equal to 6, or 0 to 6, or 1 to 6, determined according to ASTM D4459-12 using a radiant exposure of 0.30 joules/meter$^2$ at 340 nanometers, and an exposure time of 300 hours.

The composition can be prepared by melt-blending or melt-kneading the components of the composition. The melt-blending or melt-kneading can be performed using common equipment such as ribbon blenders, HENSCHEL™ mixers, BANBURY™ mixers, drum tumblers, single-screw extruders, twin-screw extruders, multi-screw extruders, co-kneaders, and the like. For example, the composition can be prepared by melt-blending the components in a twin-screw extruder at a temperature of 230 to 260° C., or 240 to 255° C.

The composition is useful for molding articles. Suitable methods of forming such articles include single layer and multilayer sheet extrusion, injection molding, blow molding, film extrusion, extrusion coating, profile extrusion, pultrusion, compression molding, thermoforming, pressure forming, hydroforming, vacuum forming, and the like. Combinations of the foregoing article fabrication methods can be used.

The composition is particularly useful for forming the jacket layer of cables. Thus, another embodiment is a jacketed cable comprising a conductor, a covering surrounding the conductor, and a jacket surrounding the covering, wherein the jacket comprises a composition comprising: 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

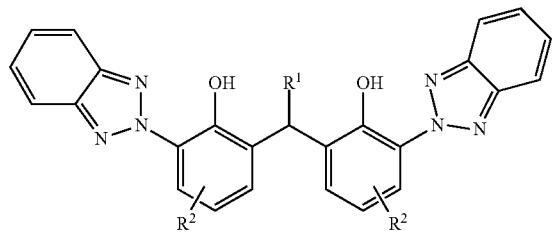

wherein $R^1$ is hydrogen or methyl; and each occurrence of $R^2$ is independently $C_4$-$C_{12}$ alkyl; wherein all parts by weight are based on 100 parts by weight total of the poly(phenylene ether), the hydrogenated block copolymer, the polypropylene, the polybutene, and the flame retardant. All of the above-described variations of the composition apply as well to the jacket composition.

The FIGURE depicts a jacketed cable 1 comprising a conductor 2, a covering 4 surrounding the conductor, and a jacket 6 surrounding the covering. The conductor 2 can be an electrical conductor (e.g., copper wire) or an optical conductor (e.g., glass fiber). The conductor can comprise multiple strands, as shown in the FIGURE, or a single strand. There is no particular limitation on the composition of the covering 4. In some embodiments, the covering 4 comprises a foamed thermoplastic composition. The jacket 6 comprises the composition, in any of its above-described variations. The jacketed cable 1 can be formed by extrusion coating of the conductor 2, with either simultaneous or step-wise extrusion of the conductor with the covering and the jacket.

In a very specific embodiment of the jacketed cable, the composition comprises 22 to 28 parts by weight of the poly(phenylene ether), 33 to 43 parts by weight of the hydrogenated block copolymer, 4 to 9 parts by weight of the polypropylene, 5 to 11 parts by weight of the polybutene, 15 to 22 parts by weight of the flame retardant, and 1.5 to 4 parts by weight of the ultraviolet absorbing agent. Optionally in this embodiment, the poly(phenylene ether) is a poly(2,6-dimethyl-1,4-phenylene ether) having an intrinsic viscosity of 0.35 to 0.5 deciliter per gram; the 33 to 43 parts by weight of the hydrogenated block copolymer comprises 27 to 37 parts by weight of a polystyrene-poly(ethylene-butylene-styrene)-polystyrene tapered block copolymer; the composition comprises 0 to 5 parts by weight of any polyolefin other than the polypropylene and the polybutene; the flame retardant consists of the aluminum tris(diethyl phosphinate) and the melamine polyphosphate; in the bis(benzotriazole) compound structure, $R^1$ is hydrogen, and each occurrence of $R^2$ is independently $C_6$-$C_{10}$ alkyl; wherein the composition further comprises 0 to 15 parts by weight mineral oil and 0 to 15 parts by weight colorant; and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

The invention includes at least the following embodiments.

Embodiment 1: A composition, comprising: 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

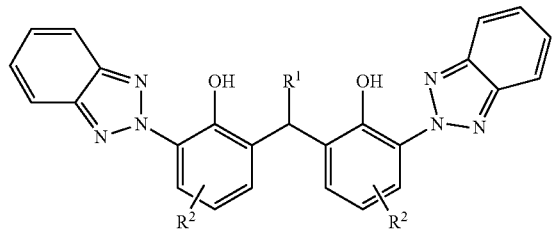

wherein $R^1$ is hydrogen or methyl; and each occurrence of $R^2$ is independently $C_4$-$C_{12}$ alkyl; wherein all parts by weight are based on 100 parts by weight total of the poly(phenylene ether), the hydrogenated block copolymer, the polypropylene, the polybutene, and the flame retardant.

Embodiment 2: The composition of embodiment 1, exhibiting a lightness value, L*, of at least 60, determined according to ASTM D2244-15a using a D65 standard illuminant, and a color change, Delta E*$_{ab}$, less than or equal to 6, determined according to ASTM D4459-12 using a radiant exposure of 0.30 joules/meter$^2$ at 340 nanometers, and an exposure time of 300 hours.

Embodiment 3: The composition of embodiment 1 or 2, wherein the poly(phenylene ether) is a poly(2,6-dimethyl-1,4-phenylene ether) having an intrinsic viscosity of 0.35 to 0.5 deciliter per gram.

Embodiment 4: The composition of embodiment 1 or 2, wherein the poly(phenylene ether) has an intrinsic viscosity of 0.35 to 0.5 deciliter per gram and comprises poly(phenylene ether) homopolymer and poly(phenylene ether)-polysiloxane block copolymer.

Embodiment 5: The composition of any one of embodiments 1-4, wherein the 25 to 45 parts by weight of the hydrogenated block copolymer comprise 25 to 35 parts by weight of a polystyrene-poly(ethylene-butylene-styrene)-polystyrene tapered block copolymer.

Embodiment 6: The composition of any one of embodiments 1-5, comprising 0 to 5 parts by weight total of any polyolefins other than the polypropylene and the polybutene.

Embodiment 7: The composition of any one of embodiments 1-6, wherein the flame retardant consists of the aluminum tris(diethyl phosphinate) and the melamine polyphosphate.

Embodiment 8: The composition of any one of embodiments 1-7, wherein in the bis(benzotriazole) compound structure, $R^1$ is hydrogen; and each occurrence of $R^2$ is independently $C_6$-$C_{10}$ alkyl.

Embodiment 9: The composition of any one of embodiments 1-8, wherein the composition further comprises 0 to 15 parts by weight mineral oil and 0 to 15 parts by weight colorant, and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

Embodiment 10: The composition of any one of embodiments 1-9, comprising 22 to 28 parts by weight of the poly(phenylene ether); 33 to 43 parts by weight of the hydrogenated block copolymer; 4 to 9 parts by weight of the polypropylene; 5 to 11 parts by weight of the polybutene; 15 to 22 parts by weight of the flame retardant; and 1.5 to 4 parts by weight of the ultraviolet absorbing agent.

Embodiment 11: The composition of embodiment 10, wherein the poly(phenylene ether) is a poly(2,6-dimethyl-1,4-phenylene ether) having an intrinsic viscosity of 0.35 to 0.5 deciliter per gram; wherein the 33 to 43 parts by weight of the hydrogenated block copolymer comprises 27 to 37 parts by weight of a polystyrene-poly(ethylene-butylene-styrene)-polystyrene tapered block copolymer; wherein the composition comprises 0 to 5 parts by weight of any polyolefin other than the polypropylene and the polybutene; wherein the flame retardant consists of the aluminum tris(diethyl phosphinate) and the melamine polyphosphate; wherein in the bis(benzotriazole) compound structure, $R^1$ is hydrogen; and each occurrence of $R^2$ is independently $C_6$-$C_{10}$ alkyl; wherein the composition further comprises 0 to 15 parts by weight mineral oil and 0 to 15 parts by weight colorant; and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

Embodiment 12: A jacketed cable comprising a conductor, insulation surrounding the conductor, and a jacket surrounding the insulation, wherein the jacket comprises a composition comprising: 15 to 40 parts by weight of a poly(phenylene ether); 25 to 45 parts by weight of a hydrogenated block copolymer of an alkenyl aromatic monomer and a conjugated diene; 5 to 15 parts by weight of a polypropylene; 5 to 15 parts by weight of a polybutene having a number average molecular weight of 500 to 1500 grams/mole; 15 to 25 parts by weight of a flame retardant comprising aluminum tris(diethyl phosphinate) and melamine polyphosphate; and 1 to 5 parts by weight of an ultraviolet absorbing agent comprising a bis(benzotriazole) compound having the structure

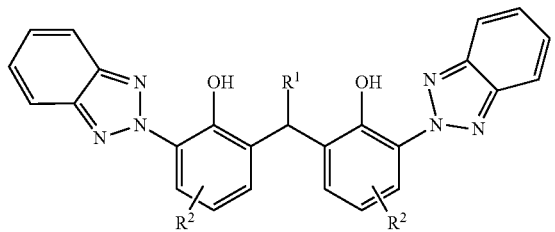

wherein R¹ is hydrogen or methyl; and each occurrence of R² is independently $C_4$-$C_{12}$ alkyl; wherein all parts by weight are based on 100 parts by weight total of the poly(phenylene ether), the hydrogenated block copolymer, the polypropylene, the polybutene, and the flame retardant.

Embodiment 13: The jacketed cable of embodiment 12, wherein the composition comprises 22 to 28 parts by weight of the poly(phenylene ether); 33 to 43 parts by weight of the hydrogenated block copolymer; 4 to 9 parts by weight of the polypropylene; 5 to 11 parts by weight of the polybutene; 15 to 22 parts by weight of the flame retardant; and 1.5 to 4 parts by weight of the ultraviolet absorbing agent.

Embodiment 14: The jacketed cable of embodiment 13, wherein the poly(phenylene ether) is a poly(2,6-dimethyl-1,4-phenylene ether) having an intrinsic viscosity of 0.35 to 0.5 deciliter per gram; wherein the 33 to 43 parts by weight of the hydrogenated block copolymer comprises 27 to 37 parts by weight of a polystyrene-poly(ethylene-butylene-styrene)-polystyrene tapered block copolymer; wherein the composition comprises 0 to 5 parts by weight of any polyolefin other than the polypropylene and the polybutene; wherein the flame retardant consists of the aluminum tris (diethyl phosphinate) and the melamine polyphosphate; wherein in the bis(benzotriazole) compound structure, R¹ is hydrogen; and each occurrence of R² is independently $C_6$-$C_{10}$ alkyl; wherein the composition further comprises 0 to 15 parts by weight of mineral oil and 0 to 15 parts by weight colorant; and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples 1-5, Comparative Examples 1-12

Components used to form the compositions are summarized in Table 1.

TABLE 1

| Component | Description |
|---|---|
| PPE | Poly(2,6-dimethyl-1,4-phenylene ether), CAS 25134-01-4, having an intrinsic viscosity of 0.46 deciliter/gram; obtained as PPO ™ 646 Resin from SABIC Innovative Plastics. |
| PPE-Si/PPE | A mixture of poly(2,6-dimethyl-1,4-phenylene ether) (CAS Reg. No. 24938-67-8) and poly(2,6-dimethyl-1,4-phenylene ether-polydimethylsiloxane block copolymer (CAS Reg. No. 1202019-56-4), the mixture having a polysiloxane content of about 5 weight percent and an intrinsic viscosity of about 0.40 deciliter per gram as measured in chloroform at 25° C.; prepared according to the procedure of U.S. Pat. No. 8,017,697 to Carrillo et al., Example 16. |
| S(EB)S 1 | Polystyrene-poly(ethylene-butylene)-polystyrene triblock copolymer, CAS Reg. No. 66070-58-4, having a polystyrene content of 30-33 weight percent and a negligible melt flow, measured at 260° C. and 5 kilogram load according to ASTM D1238; obtained as KRATON ™ G1651 Resin from Kraton Performance Polymers. |
| S(EB)S 2 | Polystyrene-poly(ethylene-butylene)-polystyrene triblock copolymer, CAS Reg. No. 66070-58-4, having a polystyrene content of 67 weight percent and a melt flow rate of 2.0 grams per 10 minutes measured at 230° C. and 2.16 kilograms according to ISO 1133; obtained as TUFTEC ™ H1043 from Asahi Chemical. |
| S(EBS)S 1 | Polystyrene-poly(ethylene-butylene-styrene)-polystyrene tapered block copolymer, having a polystyrene content of 37 to 44 weight percent and a melt flow index of 7 grams per 10 minutes, measured at 260° C. and 5 kilogram load according to ASTM D1238; obtained as KRATON ™ A1536 HU Resin from Kraton Performance Polymers. |
| S(EBS)S 2 | Polystyrene-poly(ethylene-butylene-styrene)-polystyrene tapered block copolymer, having a polystyrene content of 56.3 to 60.3 weight percent and a melt flow index of less than 1 gram per 10 minutes, measured at 230° C. and 5 kilogram load according to ASTM D1238; obtained as KRATON ™ A1535 HU Resin from Kraton Performance Polymers. |
| TPE | A melt-kneaded blend comprising about 35 weight percent polystyrene-poly(ethylene-butylene)-polystyrene triblock copolymer (CAS Reg. No. 66070-58-4), about 20 weight percent ethylene-propylene copolymer (CAS. Reg. No. 9010-79-1), and about 45 weight percent mineral oil (CAS Reg. No. 72623-83-7); obtained as Sumitomo TPE-SB 2400 from Sumitomo Chemical Co., Ltd. |
| PP | Propylene homopolymer, CAS Reg. No. 9003-07-0, having a melt flow index of 8 grams per 10 minutes, measured at 230° C. and 2.16 kilogram load according to ASTM D1238; obtained as PP 570P Resin from SABIC. |

TABLE 1-continued

| Component | Description |
|---|---|
| Polybutene | Polybutene, CAS Reg. No. 9003-29-6, having a kinematic viscosity of 100-125 centistokes at 100° C.; obtained as INDOPOL ™ H-50 from INEOS, or PB800 from Daelim Industrial Co. Ltd. |
| Al(OP(O)Et$_2$)$_3$ | Aluminum tris(diethyl phosphinate), CAS Reg. No. 225789-38-8; obtained as EXOLIT OP1230 from Clariant. |
| MPP | Melamine polyphosphate, CAS Reg. No. 56386-64-2, obtained as BUDIT ™ 3141 from Budenheim Iberica, S.A. |
| Benzotriazole UVA 1 | 2-(2H-benzotriazol-2-yl)-4,6-bis(1-methyl-1-phenylethyl)phenol, CAS Reg. No. 70321-86-7; obtained as TINUVIN ™ 234 from BASF. |
| Benzotriazole UVA 2 | 2,2'-Methylene bis[4-(1,1,3,3-tetramethylbutyl)-6-(2H-benzotriazole-2-yl)phenol], CAS Reg. No. 103597-45-1; obtained as LA-31RG from Amfine Chemical Corporation, or as TINUVIN ™ 360 from BASF. |
| Triazine UVA 1 | 2-(4,6-diphenyl-1,3,5-triazin-2-yl)-5-[(hexyl)oxy]phenol, CAS Reg. No. 147315-50-2; obtained as TINUVIN ™ 1577 from BASF. |
| Triazine UVA 2 | 2-(4,6-Bis(2,4-dimethylphenyl)-1,3,5-triazin-2-yl)-5-(octyloxy)-phenol, CAS Reg. No. 2725-22-6; obtained as CHIGUARD ™ 1064 from Chitec. |
| UV Stab. HALS | Poly(4-hydroxy-2,2,6,6-tetramethyl-1-piperidine ethanol-alt-1,4-butanedioic acid), CAS Reg. No. 65447-77-0; obtained as CHIGUARD ™ 622LD from Chitec. |
| CER | 3,4-Epoxycyclohexylmethyl 3,4-epoxycyclohexanecarboxylate, CAS Reg. No. 2386-87-0; obtained as CELLOXIDE ™ 2021P from Daicel Corp. |
| AO1 | Reaction products of phosphorus trichloride with 1,1'-biphenyl and 2,4-bis(1,1-dimethylethyl)phenol, CAS Reg. No. 119345-01-6; obtained as HOSTANOX ™ P-EPQ ™ from Clariant. |
| AO2 | 2',3-bis[[3-[3,5-di-tert-butyl-4-hydroxyphenyl]propionyl]] propionohydrazide, CAS Reg. No. 32687-78-8; obtained as IRGANOX ™ MD 1024 from Ciba. |
| AO3 | Octadecyl-3-(3,5-di-tert-butyl-4-hydroxyphenyl) propionate, CAS Reg. No. 2082-79-3; obtained as IRGANOX ™ 1076 from BASF. |
| TBPP | Tris(2,4-di-tert-butylphenyl) phosphite, CAS Reg. No. 31570-04-4; obtained as IRGAFOS ™ 168 from BASF. |
| Erucamide | Erucamide, CAS Reg. No. 112-84-5; obtained as KEMAMIDE ™ E Ultra from Crompton Corp. |
| Fragrance | Polyethylene-encapsulated fragrance; obtained as POLYIFF ™ 7191-PBD from International Flavors and Fragrances Inc. |
| TiO$_2$ 1 | Titanium dioxide, CAS Reg. No. 13463-67-7; obtained as TIOXIDE ™ R-TC30 from Huntsman. |
| TiO$_2$ 2 | Titanium dioxide, CAS Reg. No. 13463-67-7; obtained as TIOXIDE ™ R-FC5 from Huntsman. |
| Carbon black | Carbon black, CAS Reg. No. 1333-86-4; obtained as MONARCH ™ 800 from Cabot. |
| Pigment Red 101 | Pigment Red 101, CAS Reg. No. 1309-37-1; obtained as BAYFERROX ™ 180M from Bayer. |
| Pigment Red 149 | Pigment Red 149, CAS Reg. No. 4948-15-6; obtained as PALIOGEN ™ Red K 3580 from BASF. |
| Pigment Red 178 | Pigment Red 178, CAS Reg. No. 3049-71-6; obtained as PALIOGEN ™ Red K 3911 from BASF. |
| Solvent Red 52 | Solvent Red 52, CAS 81-39-0; obtained as MACROLEX ™ Red 5B Granulate/FG from Lanxess. |
| Pigment Blue 15:4 | Pigment Blue 15:4, CAS Reg. No. 147-14-8; obtained as SUNFAST ™ Blue 15:4, 249-3450 from Sun Chemical. |
| Pigment Blue 29 | Pigment Blue 29, CAS Reg. No. 57455-37-5; obtained as Ultramarine 5085 from Holliday Pigments, a division of Huntsman. |
| Solvent Blue 104 | Solvent Blue 104, obtained as SOLVAPERM ™ Blue 2B from Clariant. |
| Solvent Green 3 | Solvent Green 3, CAS 128-80-3; obtained as MACROLEX ™ Green 5B from Lanxess. |
| Pigment Yellow 119 | Pigment Yellow 119, CAS Reg. No. 68187-51-9; obtained as MAPICO ™ Tan 10A from Rockwood Pigments. |
| Orange colorant | Orange colorant; obtained as MACROLEX ™ Orange R from Lanxess. |
| Pigment Brown 24 | Pigment Brown 24, CAS Reg. No. 68186-90-3; obtained as SICOTAN ™ Yellow K2001 FG from BASF. |

Compositions were formed by melt mixing in a twin-screw extruder operating at zone temperatures from feed throat to die of 50° C., 180° C., 225° C., 245° C., 245° C., 245° C., 245° C., 245° C., 245° C., 245° C., 245° C., a die temperature of 255° C., a screw rotation rate of 450 rotations per minute, and a throughput of about 30 kilograms per hour. The extrudate was cooled and pelletized.

Prior to use for injection molding, pellets were dried for four hours at 80° C. Molded parts for property testing were injection molded using zone temperatures from feed throat to die of 240° C., 250° C., and 250° C., a nozzle temperature of 250° C., a mold temperature of 40° C., an injection speed of 25 millimeters/second, a holding pressure of 600 kilogram force per centimeter$^2$, and a maximum injection pressure of 1,000 kilogram force per centimeter$^2$.

Melt flow rate was determined according to ASTM D1238-13 at 250° C. and 10 kilogram load. Flexural properties determined according to ASTM D790-15e1 at 23° C. using bar cross-sectional dimensions of 6.4×12.7 millimeters, and a test speed of 12.5 millimeters/minute. Tensile properties were determined according to ASTM D638-14 at 23° C. using a Type I bar, a gage length of 50 millimeters, and a test speed of 50 millimeters/minute. Shore A hardness was determined according to ASTM D2240-15 at 23° C. and a sample thickness of 6.4 millimeters. CIELAB color parameters L*, a*, and b* were determined according to ASTM D2244-15a using a D65 standard illuminant. Ultraviolet aging was conducted according to ASTM D4459-12 using a radiant exposure of 0.30 joules/meter$^2$ at 340 nanometers, and an exposure time of 300 hours. Delta $E^*_{ab}$, which is the color change associated with ultraviolet aging, was calculated according to the equation, $$\text{Delta } E^*_{ab} = [(\Delta L^*)^2 + (\Delta a^*)^2 + (\Delta b^*)^2]^{1/2}.$$

Wire samples for property testing utilized a copper conductor consisting of 41 strands of 0.16 diameter copper, the conductor having a diameter of 1.16 millimeters. The outer diameter of the wire was 2.7 millimeters.

Tensile properties of wire samples were determined according to UL 1581 using a test speed of 500 millimeters/minute, and preconditioning at 23° C. for 24 hours, or at 136° C. for 168 hours. Distortion of wire samples was determined according to UL 1581 using a temperature of 150° C., a weight of 300 grams, and a time of 1 hour. The VW-1 flame retardancy test was conducted according to UL 1581; the 1C and 2C tests correspond to single wire and two parallel wires, respectively.

Table 2 summarizes compositions and properties. In the Compositions section of the table, component amounts are expressed in parts by weight per 100 parts by weight total of the poly(phenylene ether), the hydrogenated block copolymer, the polypropylene, the polybutene, and the flame retardant. The results show that relative to compositions containing UV absorber, the Comparative Example 1-3 compositions exhibited relatively high color shifts, Delta E, after 300 hours exposure to ultraviolet light. Among compositions containing UV absorber, the best UV stability is exhibited by the inventive Examples 1-6 compositions incorporating the bis(benzotriazole) UV absorber, Benzotriazole UVA 2. As illustrated by the Example 3 composition, a relatively low color shift can be achieved at a low loading of bis(benzotriazole) UV absorber. As illustrated by Examples 5 and 6, the effectiveness of the bis(benzotriazole) UV absorber extends to compositions in which the poly(phenylene ether) is a combination of poly(phenylene ether) homopolymer and poly(phenylene ether)-polysiloxane block copolymer. Finally, as illustrated by a comparison of Examples 1 and 2, UV stability is adversely affected by increasing the content of the hindered phenol-substituted hydrazide, A02, from 0.101 to 3.518 parts by weight per 100 parts by weight total of the poly(phenylene ether), the hydrogenated block copolymer, the polypropylene, the polybutene, and the flame retardant.

TABLE 2

| | C. Ex. 1 | C. Ex. 2 | C. Ex. 3 | C. Ex. 4 | C. Ex. 5 | C. Ex. 6 |
|---|---|---|---|---|---|---|
| COMPOSITIONS | | | | | | |
| PPE | 29.181 | 29.181 | 29.181 | 25.000 | 25.000 | 25.000 |
| PPE-Si/PPE | 0.000 | 0.000 | 0.000 | 0.000 | 0.000 | 0.000 |
| S(EB)S 1 | 2.245 | 2.245 | 2.245 | 0.000 | 0.000 | 0.000 |
| S(EB)S 2 | 2.245 | 2.245 | 3.367 | 0.000 | 0.000 | 0.000 |
| S(EBS)S 1 | 28.058 | 28.058 | 28.058 | 20.000 | 20.000 | 14.000 |
| S(EBS)S 2 | 0.000 | 0.000 | 0.000 | 10.000 | 10.000 | 12.000 |
| TPE | 17.957 | 17.957 | 17.957 | 16.000 | 16.000 | 16.000 |
| PP | 4.489 | 4.489 | 4.489 | 4.000 | 4.000 | 8.000 |
| Polybutene | 9.540 | 9.540 | 8.418 | 8.000 | 8.000 | 8.000 |
| Al(OP(O)Et$_2$)$_3$ | 8.979 | 8.979 | 8.979 | 8.500 | 8.500 | 8.500 |
| MPP | 8.979 | 8.979 | 8.979 | 8.500 | 8.500 | 8.500 |
| Erucamide | 0.449 | 0.449 | 0.449 | 0.400 | 0.400 | 0.400 |
| CER | 0.561 | 0.561 | 0.561 | 0.000 | 0.000 | 0.000 |
| AO1 | 0.281 | 0.281 | 0.281 | 0.250 | 0.250 | 0.250 |
| AO2 | 0.112 | 0.112 | 0.112 | 0.100 | 0.100 | 0.100 |
| AO3 | 0.842 | 0.842 | 0.842 | 0.750 | 0.750 | 0.750 |
| TBPP | 0.000 | 0.000 | 0.000 | 0.000 | 0.000 | 0.000 |
| Benzotriazole UVA 1 | 0.000 | 0.000 | 0.000 | 0.000 | 0.000 | 0.000 |
| Benzotriazole UVA 2 | 0.000 | 0.000 | 0.000 | 0.000 | 0.000 | 0.000 |
| Triazine UVA 1 | 0.000 | 0.000 | 0.000 | 0.000 | 0.000 | 0.000 |
| Triazine UVA 2 | 0.000 | 0.000 | 0.000 | 2.000 | 3.000 | 3.000 |
| UV Stab. HALS | 0.000 | 0.000 | 0.000 | 0.000 | 0.000 | 0.000 |
| Fragrance | 0.000 | 0.000 | 0.000 | 0.000 | 0.000 | 0.000 |
| TiO$_2$ 1 | 0.000 | 6.510 | 5.612 | 5.000 | 5.000 | 5.000 |
| TiO$_2$ 2 | 3.418 | 0.000 | 0.000 | 0.000 | 0.000 | 0.000 |
| Carbon black | 0.0002 | 0.000 | 0.00003 | 0.00003 | 0.00003 | 0.00003 |
| Pigment Blue 29 | 0.013 | 0.101 | 0.098 | 0.087 | 0.087 | 0.087 |
| Pigment Red 101 | 0.000 | 0.063 | 0.000 | 0.000 | 0.000 | 0.000 |
| Pigment Brown 24 | 0.0023 | 0.000 | 0.000 | 0.000 | 0.000 | 0.000 |
| Pigment Red 178 | 0.0003 | 0.000 | 0.0012 | 0.0013 | 0.0012 | 0.0012 |
| PROPERTIES | | | | | | |
| Composition and Molded Part Properties | | | | | | |
| Delta $E^*_{ab}$ | 18.0 | 20.0 | 22.0 | 14.8 | 3.8 | 5.5 |
| MFR (g/10 min) | — | 17 | 11 | 9 | 9 | 15 |
| Tens. stress at break (MPa) | — | 13 | 16 | 14 | 13 | 14 |
| Tens. elong. at break (%) | — | 256 | 279 | 258 | 266 | 252 |

TABLE 2-continued

| | | | | | | |
|---|---|---|---|---|---|---|
| Flex. modulus (MPa) | — | 18 | 25 | 21 | 19 | 35 |
| Shore A hardness | — | 77 | 79 | 77 | 75 | 85 |
| Wire Properties | | | | | | |
| Tens. strength (MPa), 23° C., 24 hours | — | — | — | — | — | — |
| Tens. elong. (%), 23° C., 24 hours | — | — | — | — | — | — |
| Tens. strength (MPa), 136° C., 168 hours | — | — | — | — | — | — |
| Tens. elong. (%), 136° C., 168 hours | — | — | — | — | — | — |
| Deformation (%), 300 g, 150° C., 1 hour | — | — | — | — | — | — |
| VW-1, 1C | — | — | — | — | — | — |
| VW-1, 2C | — | — | — | — | — | — |

| | C. Ex. 7 | C. Ex. 8 | C. Ex. 9 | C. Ex. 10 | C. Ex. 11 | C. Ex. 12 |
|---|---|---|---|---|---|---|
| COMPOSITIONS | | | | | | |
| PPE | 25.000 | 28.058 | 28.058 | 28.058 | 28.058 | 28.058 |
| PPE-Si/PPE | 0.000 | 0.000 | 0.000 | 0.000 | 0.000 | 0.000 |
| S(EB)S 1 | 0.000 | 0.000 | 0.000 | 0.000 | 0.000 | 0.000 |
| S(EB)S 2 | 0.000 | 0.000 | 0.000 | 0.000 | 0.000 | 0.000 |
| S(EBS)S 1 | 18.000 | 17.957 | 17.957 | 17.957 | 17.957 | 17.957 |
| S(EBS)S 2 | 10.000 | 13.468 | 13.468 | 13.468 | 13.468 | 13.468 |
| TPE | 16.000 | 17.957 | 17.957 | 17.957 | 17.957 | 17.957 |
| PP | 6.000 | 6.734 | 6.734 | 6.734 | 6.734 | 6.734 |
| Polybutene | 8.000 | 8.418 | 8.418 | 8.418 | 8.418 | 8.418 |
| Al(OP(O)Et$_2$)$_3$ | 8.500 | 9.540 | 9.540 | 9.540 | 9.540 | 9.540 |
| MPP | 8.500 | 9.540 | 9.540 | 9.540 | 9.540 | 9.540 |
| Erucamide | 0.400 | 0.449 | 0.449 | 0.449 | 0.449 | 0.449 |
| CER | 0.000 | 0.561 | 0.561 | 0.561 | 0.561 | 0.561 |
| AO1 | 0.250 | 0.281 | 0.281 | 0.281 | 0.281 | 0.281 |
| AO2 | 0.100 | 0.112 | 0.112 | 0.112 | 0.112 | 0.112 |
| AO3 | 0.750 | 0.842 | 0.842 | 0.754 | 0.754 | 0.754 |
| TBPP | 0.000 | 0.000 | 0.000 | 0.000 | 0.000 | 0.000 |
| Benzotriazole UVA 1 | 0.000 | 2.245 | 0.000 | 5.612 | 0.000 | 0.000 |
| Benzotriazole UVA 2 | 0.000 | 0.000 | 0.000 | 0.000 | 0.000 | 0.000 |
| Triazine UVA 1 | 0.000 | 0.000 | 0.000 | 0.000 | 0.000 | 0.000 |
| Triazine UVA 2 | 3.000 | 2.245 | 5.612 | 0.000 | 4.489 | 5.612 |
| UV Stab. HALS | 1.000 | 1.122 | 1.122 | 1.122 | 0.000 | 0.000 |
| Fragrance | 0.000 | 0.000 | 0.000 | 0.000 | 0.000 | 0.000 |
| TiO$_2$ 1 | 5.000 | 5.612 | 5.612 | 5.612 | 6.835 | 13.148 |
| TiO$_2$ 2 | 0.000 | 0.000 | 0.000 | 0.000 | 0.000 | 0.000 |
| Carbon black | 0.00003 | 0.00051 | 0.00051 | 0.00051 | 0.0001 | 0.0012 |
| Pigment Blue 29 | 0.087 | 0.089 | 0.089 | 0.089 | 0.100 | 0.167 |
| Pigment Red 101 | 0.000 | 0.039 | 0.039 | 0.039 | 0.062 | 0.129 |
| Pigment Brown 24 | 0.000 | 0.000 | 0.000 | 0.000 | 0.000 | 0.000 |
| Pigment Red 178 | 0.0012 | 0.000 | 0.000 | 0.000 | 0.000 | 0.000 |
| PROPERTIES | | | | | | |
| Composition and Molded Part Properties | | | | | | |
| Delta E*$_{ab}$ | 8.5 | 11.5 | 2.2 | 2.6 | 5.1 | 2.2 |
| MFR (g/10 min) | 15 | 18 | 18 | 16 | — | 14 |
| Tens. stress at break (MPa) | 13 | — | — | — | 13 | 16 |
| Tens. elong. at break (%) | 263 | — | — | — | 249 | 232 |
| Flex. modulus (MPa) | 26 | — | — | — | 22 | 26 |
| Shore A hardness | 81 | — | — | — | 79 | 81 |
| Wire Properties | | | | | | |
| Tens. strength (MPa), 23° C., 24 hours | — | 21 | 22 | 22 | 22 | 19 |
| Tens. elong. (%), 23° C., 24 hours | — | 299 | 321 | 283 | 330 | 341 |
| Tens. strength (MPa), 136° C., 168 hours | — | 20 | 21 | 21 | 23 | 20 |
| Tens. elong. (%), 136° C., 168 hours | — | 262 | 278 | 249 | 270 | 274 |
| Deformation (%), 300 g, 150° C., 1 hour | — | 36 | 42 | 41 | 35 | 33 |
| VW-1, 1C | — | Pass | Pass | Pass | Pass | Pass |
| VW-1, 2C | — | Pass | Pass | Pass | Pass | Pass |

TABLE 2-continued

|  | Ex. 1 | Ex. 2 | Ex. 3 | Ex. 4 | Ex. 5 | Ex. 6 |
|---|---|---|---|---|---|---|
| COMPOSITIONS | | | | | | |
| PPE | 28.058 | 28.058 | 28.058 | 28.058 | 0.000 | 0.000 |
| PPE-Si/PPE | 0.000 | 0.000 | 0.000 | 0.000 | 28.058 | 28.058 |
| S(EB)S 1 | 0.000 | 0.000 | 0.000 | 0.000 | 0.000 | 0.000 |
| S(EB)S 2 | 0.000 | 0.000 | 0.000 | 0.000 | 0.000 | 0.000 |
| S(EBS)S 1 | 17.957 | 17.957 | 17.957 | 17.957 | 17.957 | 17.957 |
| S(EBS)S 2 | 13.468 | 13.468 | 13.468 | 13.468 | 13.468 | 13.468 |
| TPE | 17.957 | 17.957 | 17.957 | 17.957 | 17.957 | 17.957 |
| PP | 6.734 | 6.734 | 6.734 | 6.734 | 6.734 | 6.734 |
| Polybutene | 8.418 | 8.418 | 8.418 | 8.418 | 8.418 | 8.418 |
| Al(OP(O)Et$_2$)$_3$ | 9.540 | 9.540 | 9.540 | 9.540 | 9.540 | 9.540 |
| MPP | 9.540 | 9.540 | 9.540 | 9.540 | 9.540 | 9.540 |
| Erucamide | 0.449 | 0.449 | 0.449 | 0.449 | 0.449 | 0.449 |
| CER | 0.561 | 0.561 | 0.561 | 0.561 | 0.561 | 0.561 |
| AO1 | 0.281 | 0.281 | 0.281 | 0.281 | 0.281 | 0.281 |
| AO2 | 0.112 | 3.928 | 0.112 | 0.112 | 1.964 | 1.122 |
| AO3 | 0.842 | 0.842 | 0.000 | 0.000 | 0.842 | 0.842 |
| TBPP | 0.000 | 0.000 | 0.842 | 0.842 | 0.000 | 0.000 |
| Benzotriazole UVA 1 | 0.000 | 0.000 | 0.000 | 0.000 | 0.000 | 0.000 |
| Benzotriazole UVA 2 | 3.928 | 3.928 | 2.806 | 2.806 | 3.928 | 2.245 |
| Triazine UVA 1 | 0.000 | 0.000 | 0.000 | 0.000 | 0.000 | 2.245 |
| Triazine UVA 2 | 0.000 | 0.000 | 0.000 | 0.000 | 0.000 | 0.000 |
| UV Stab. HALS | 0.000 | 0.000 | 0.000 | 0.000 | 0.000 | 0.000 |
| Fragrance | 0.000 | 0.000 | 0.067 | 0.067 | 0.000 | 0.000 |
| TiO$_2$ 1 | 12.346 | 12.346 | 10.624 | 0.000 | 6.734 | 6.734 |
| TiO$_2$ 2 | 0.000 | 0.000 | 0.000 | 0.000 | 0.000 | 0.000 |
| Carbon black | 0.0001 | 0.0001 | 0.0001 | 0.000 | 0.000 | 0.000 |
| Pigment Blue 29 | 0.157 | 0.157 | 0.146 | 0.000 | 0.099 | 0.099 |
| Pigment Red 101 | 0.121 | 0.121 | 0.099 | 0.000 | 0.062 | 0.062 |
| Pigment Brown 24 | 0.000 | 0.000 | 0.000 | 0.000 | 0.000 | 0.000 |
| Pigment Red 178 | 0.000 | 0.000 | 0.000 | 0.000 | 0.000 | 0.000 |
| PROPERTIES | | | | | | |
| Composition and Molded Part Properties | | | | | | |
| Delta E*$_{ab}$ | 1.7 | 4.4 | 1.5 | — | 2.2 | 5.5 |
| MFR (g/10 min) | — | — | 5 | 10 | 12 | 11 |
| Tens. stress at break (MPa) | — | — | 17 | 15 | 17 | 17 |
| Tens. elong. at break (%) | — | — | 237 | 245 | 238 | 242 |
| Flex. modulus (MPa) | — | — | 28 | 27 | 57 | 51 |
| Shore A hardness | — | — | 81 | 81 | 85 | 84 |
| Wire Properties | | | | | | |
| Tens. strength (MPa), 23° C., 24 hours | — | — | 22 | — | 21 | 20 |
| Tens. elong. (%), 23° C., 24 hours | — | — | 325 | — | 353 | 344 |
| Tens. strength (MPa), 136° C., 168 hours | — | — | 23 | — | 21 | 20 |
| Tens. elong. (%), 136° C., 168 hours | — | — | 265 | — | 297 | 279 |
| Deformation (%), 300 g, 150° C., 1 hour | — | — | 28 | — | 31 | 35 |
| VW-1, 1C | — | — | Pass | — | Pass | Pass |
| VW-1, 2C | — | — | Pass | — | Pass | 67% Pass |

Examples 7-10, Comparative Examples 13-17

These examples further illustrate the effects of the invention. Compositions and properties are summarized in Table 3. The results show that Examples 7-10 exhibit relatively low color changes after ultraviolet exposure (Delta E*$_{ab}$), while exhibiting comparable tensile, flexural, and hardness properties relative to Comparative Examples 13-17.

TABLE 3

|  | Ex. 7 | Ex. 8 | Ex. 9 | Ex. 10 | C. Ex. 13 | C. Ex. 14 |
|---|---|---|---|---|---|---|
| COMPOSITIONS | | | | | | |
| PPE | 28.058 | 28.058 | 28.058 | 28.058 | 28.969 | 28.969 |
| S(EB)S 1 | 0.000 | 0.000 | 0.000 | 0.000 | 4.457 | 4.457 |
| S(EB)S 2 | 0.000 | 0.000 | 0.000 | 0.000 | 2.228 | 2.228 |
| S(EBS)S 1 | 17.957 | 17.957 | 17.957 | 17.957 | 24.513 | 24.513 |
| S(EBS)S 2 | 13.468 | 13.468 | 13.468 | 13.468 | 0.000 | 0.000 |
| TPE | 17.957 | 17.957 | 17.957 | 17.957 | 16.713 | 16.713 |

TABLE 3-continued

| | | | | | | |
|---|---|---|---|---|---|---|
| PP | 6.734 | 6.734 | 6.734 | 6.734 | 8.914 | 8.914 |
| Polybutene | 8.418 | 8.418 | 8.418 | 8.418 | 9.471 | 9.471 |
| Al(OP(O)Et$_2$)$_3$ | 9.540 | 9.540 | 9.540 | 9.540 | 7.799 | 7.799 |
| MPP | 9.540 | 9.540 | 9.540 | 9.540 | 7.799 | 7.799 |
| Erucamide | 0.449 | 0.449 | 0.449 | 0.449 | 0.446 | 0.446 |
| CER | 0.561 | 0.561 | 0.561 | 0.561 | 0.557 | 0.557 |
| AO1 | 0.281 | 0.281 | 0.281 | 0.281 | 0.279 | 0.279 |
| AO2 | 0.112 | 0.112 | 0.112 | 0.112 | 0.111 | 0.111 |
| AO3 | 0.000 | 0.000 | 0.000 | 0.000 | 0.836 | 0.836 |
| TBPP | 0.842 | 0.842 | 0.842 | 0.842 | 0.000 | 0.000 |
| Benzotriazole UVA 2 | 2.806 | 2.806 | 2.806 | 2.806 | 0.000 | 0.000 |
| Fragrance | 0.067 | 0.067 | 0.067 | 0.067 | 0.059 | 0.059 |
| TiO$_2$ 1 | 4.672 | 11.679 | 2.686 | 5.022 | 3.961 | 1.056 |
| Carbon black | 0.000 | 0.000 | 0.004 | 0.001 | 0.000 | 0.000 |
| Pigment Red 101 | 0.000 | 0.000 | 0.000 | 0.000 | 0.000 | 0.000 |
| Pigment Blue 15:4 | 0.000 | 0.000 | 0.000 | 0.119 | 0.000 | 0.000 |
| Pigment Blue 29 | 0.000 | 0.000 | 0.025 | 0.035 | 0.000 | 0.000 |
| Pigment Red 149 | 0.047 | 0.055 | 0.000 | 0.000 | 0.415 | 0.490 |
| Pigment Yellow 119 | 0.000 | 0.000 | 0.042 | 0.000 | 0.000 | 0.000 |
| Solvent Green 3 | 0.000 | 0.000 | 0.017 | 0.000 | 0.000 | 0.000 |
| Solvent Red 52 | 0.005 | 0.029 | 0.000 | 0.000 | 0.000 | 0.000 |
| Orange colorant | 0.000 | 0.000 | 0.000 | 0.000 | 0.215 | 0.385 |
| Solvent Blue 104 | 0.000 | 0.000 | 0.000 | 0.000 | 0.000 | 0.000 |
| PROPERTIES | | | | | | |
| Composition and Molded Part Properties | | | | | | |
| L* | 80.5 | 80.8 | 76.3 | 66.8 | 62.1 | 51.0 |
| a* | 17.1 | 20.5 | −6.7 | −17.5 | 34.6 | 49.9 |
| b* | 9.6 | 2.5 | −1.7 | −30.6 | 39.6 | 38.4 |
| Delta E*$_{ab}$ | 2.7 | 1.4 | ND* | 3.8 | 5.7 | 4.1 |
| MFR (g/10 min) | 12 | 15 | 11 | 12 | 24 | 22 |
| Tens. stress at break (MPa) | 17 | 15 | 18 | 18 | 17 | 17 |
| Tens. elong. at break (%) | 255 | 233 | 258 | 262 | 263 | 271 |
| Flex. modulus (MPa) | 28 | 27 | 27 | 28 | 33 | 33 |
| Shore A hardness | 82 | 83 | 82 | 82 | 84 | 83 |
| Wire Properties | | | | | | |
| Tens. strength (MPa), 23° C., 24 hours | 21 | 21 | 22 | 22 | 22 | 21 |
| Tens. elong. (%), 23° C., 24 hours | 312 | 307 | 312 | 323 | 322 | 327 |
| Tens. strength (MPa), 136° C., 168 hours | 23 | 22 | 23 | 23 | 22 | 22 |
| Tens. elong. (%), 136° C., 168 hours | 269 | 260 | 268 | 272 | 271 | 269 |
| Deformation (%), 300 g, 150° C., 1 hour | 24 | 24 | 26 | 27 | 26 | 26 |
| VW-1, 1C | Pass | Pass | Pass | 67% Pass | 67% Pass | 67% Pass |
| VW-1, 2C | Pass | Pass | Pass | Pass | Pass | Pass |

| | C. Ex. 15 | C. Ex. 16 | C. Ex. 17 |
|---|---|---|---|
| COMPOSITIONS | | | |
| PPE | 28.969 | 28.969 | 28.969 |
| S(EB)S 1 | 4.457 | 4.457 | 4.457 |
| S(EB)S 2 | 2.228 | 2.228 | 2.228 |
| S(EBS)S 1 | 24.513 | 24.513 | 24.513 |
| S(EBS)S 2 | 0.000 | 0.000 | 0.000 |
| TPE | 16.713 | 16.713 | 16.713 |
| PP | 8.914 | 8.914 | 8.914 |
| Polybutene | 9.471 | 9.471 | 9.471 |
| Al(OP(O)Et$_2$)$_3$ | 7.799 | 7.799 | 7.799 |
| MPP | 7.799 | 7.799 | 7.799 |
| Erucamide | 0.446 | 0.446 | 0.446 |
| CER | 0.557 | 0.557 | 0.557 |
| AO1 | 0.279 | 0.279 | 0.279 |
| AO2 | 0.111 | 0.111 | 0.111 |
| AO3 | 0.836 | 0.836 | 0.836 |
| TBPP | 0.000 | 0.000 | 0.000 |
| Benzotriazole UVA 2 | 0.000 | 0.000 | 0.000 |
| Fragrance | 0.059 | 0.059 | 0.059 |
| TiO$_2$ 1 | 0.339 | 0.000 | 1.471 |
| Carbon black | 0.000 | 0.113 | 0.351 |
| Pigment Red 101 | 0.000 | 0.000 | 0.260 |
| Pigment Blue 15:4 | 0.000 | 0.566 | 0.000 |
| Pigment Blue 29 | 0.000 | 0.000 | 0.453 |
| Pigment Red 149 | 0.566 | 0.000 | 0.000 |

TABLE 3-continued

| | | | |
|---|---|---|---|
| Pigment Yellow 119 | 0.000 | 0.000 | 0.000 |
| Solvent Green 3 | 0.000 | 0.000 | 0.000 |
| Solvent Red 52 | 0.000 | 0.000 | 0.000 |
| Orange colorant | 0.091 | 0.000 | 0.000 |
| Solvent Blue 104 | 0.000 | 0.453 | 0.000 |
| PROPERTIES | | | |
| Composition and Molded Part Properties | | | |
| L* | 51.1 | 28.7 | 32.1 |
| a* | 50.5 | −1.4 | −0.1 |
| b* | 30.1 | −15.0 | −2.3 |
| Delta $E^*_{ab}$ | 2.9 | ND | 1.7 |
| MFR (g/10 min) | 21 | 20 | 19 |
| Tens. stress at break (MPa) | 17 | 18 | 16 |
| Tens. elong. at break (%) | 269 | 279 | 267 |
| Flex. modulus (MPa) | 34 | 32 | 27 |
| Shore A hardness | 83 | 84 | 82 |
| Wire Properties | | | |
| Tens. strength (MPa), 23° C., 24 hours | 21 | 22 | ND |
| Tens. elong. (%), 23° C., 24 hours | 327 | 340 | ND |
| Tens. strength (MPa), 136° C., 168 hours | 22 | 22 | ND |
| Tens. elong. (%), 136° C., 168 hours | 288 | 287 | ND |
| Deformation (%), 300 g, 150° C., 1 hour | 26 | 25 | ND |
| VW-1, 1C | Pass | Pass | ND |
| VW-1, 2C | Pass | 67% Pass | ND |

*ND = not determined

The invention claimed is:

1. A composition, comprising:
   15 to 40 parts by weight of a poly(phenylene ether);
   25 to 45 parts by weight of a hydrogenated block copolymer of an alkenyl aromatic monomer and a conjugated diene;
   5 to 15 parts by weight of a polypropylene;
   5 to 15 parts by weight of a polybutene having a number average molecular weight of 500 to 1500 grams/mole;
   15 to 25 parts by weight of a flame retardant comprising aluminum tris(diethyl phosphinate) and melamine polyphosphate; and
   2 to 3 parts by weight of an ultraviolet absorbing agent comprising a bis(benzotriazole) compound having the structure

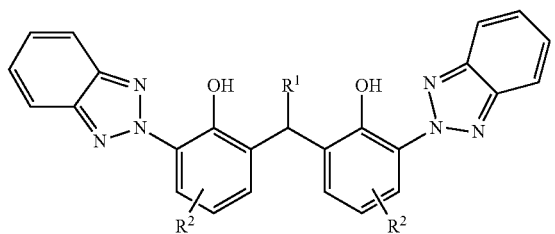

wherein $R^1$ is hydrogen or methyl; and each occurrence of $R^2$ is independently $C_4$-$C_{12}$ alkyl;
   wherein all parts by weight are based on 100 parts by weight total of the poly(phenylene ether), the hydrogenated block copolymer, the polypropylene, the polybutene, and the flame retardant.

2. The composition of claim 1, exhibiting a lightness value, L*, of at least 60, determined according to ASTM D2244-15a using a D65 standard illuminant, and a color change, Delta $E^*_{ab}$, less than or equal to 6, determined according to ASTM D4459-12 using a radiant exposure of 0.30 joules/meter$^2$ at 340 nanometers, and an exposure time of 300 hours.

3. The composition of claim 1, wherein the poly(phenylene ether) is a poly(2,6-dimethyl-1,4-phenylene ether) having an intrinsic viscosity of 0.35 to 0.5 deciliter per gram.

4. The composition of claim 1, wherein the poly(phenylene ether) has an intrinsic viscosity of 0.35 to 0.5 deciliter per gram and comprises poly(phenylene ether) homopolymer and poly(phenylene ether)-polysiloxane block copolymer.

5. The composition of claim 1, wherein the 25 to 45 parts by weight of the hydrogenated block copolymer comprise 25 to 35 parts by weight of a polystyrene-poly(ethylene-butylene-styrene)-polystyrene tapered block copolymer.

6. The composition of claim 1, comprising 0 to 5 parts by weight total of any polyolefins other than the polypropylene and the polybutene.

7. The composition of claim 1, wherein the flame retardant consists of the aluminum tris(diethyl phosphinate) and the melamine polyphosphate.

8. The composition of claim 1, wherein in the bis(benzotriazole) compound structure, $R^1$ is hydrogen; and each occurrence of $R^2$ is independently $C_6$-$C_{10}$ alkyl.

9. The composition of claim 1, wherein the composition further comprises 0 to 15 parts by weight mineral oil and 0 to 15 parts by weight colorant, and wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

10. The composition of claim 1, comprising
22 to 28 parts by weight of the poly(phenylene ether);
33 to 43 parts by weight of the hydrogenated block copolymer;
4 to 9 parts by weight of the polypropylene;
5 to 11 parts by weight of the polybutene;
15 to 22 parts by weight of the flame retardant; and
2 to 3 parts by weight of the ultraviolet absorbing agent.

11. The composition of claim 10,
wherein the poly(phenylene ether) is a poly(2,6-dimethyl-1,4-phenylene ether) having an intrinsic viscosity of 0.35 to 0.5 deciliter per gram;
wherein the 33 to 43 parts by weight of the hydrogenated block copolymer comprises 27 to 37 parts by weight of a polystyrene-poly(ethylene-butylene-styrene)-polystyrene tapered block copolymer;
wherein the composition comprises 0 to 5 parts by weight of any polyolefin other than the polypropylene and the polybutene;
wherein the flame retardant consists of the aluminum tris(diethyl phosphinate) and the melamine polyphosphate;
wherein in the bis(benzotriazole) compound structure, $R^1$ is hydrogen; and each occurrence of $R^2$ is independently $C_6$-$C_{10}$ alkyl;
wherein the composition further comprises 0 to 15 parts by weight mineral oil and 0 to 15 parts by weight colorant; and
wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

12. A jacketed cable comprising a conductor, insulation surrounding the conductor, and a jacket surrounding the insulation, wherein the jacket comprises a composition comprising:
15 to 40 parts by weight of a poly(phenylene ether);
25 to 45 parts by weight of a hydrogenated block copolymer of an alkenyl aromatic monomer and a conjugated diene;
5 to 15 parts by weight of a polypropylene;
5 to 15 parts by weight of a polybutene having a number average molecular weight of 500 to 1500 grams/mole;
15 to 25 parts by weight of a flame retardant comprising aluminum tris(diethyl phosphinate) and melamine polyphosphate; and
2 to 3 parts by weight of an ultraviolet absorbing agent comprising a bis(benzotriazole) compound having the structure

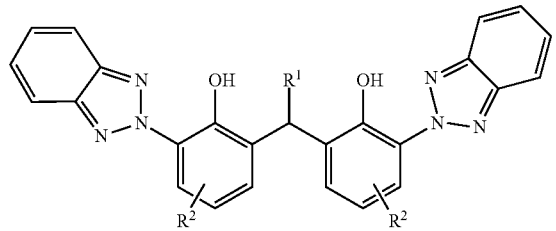

wherein $R^1$ is hydrogen or methyl; and each occurrence of $R^2$ is independently $C_4$-$C_{12}$ alkyl;
wherein all parts by weight are based on 100 parts by weight total of the poly(phenylene ether), the hydrogenated block copolymer, the polypropylene, the polybutene, and the flame retardant.

13. The jacketed cable of claim 12, wherein the composition comprises
22 to 28 parts by weight of the poly(phenylene ether);
33 to 43 parts by weight of the hydrogenated block copolymer;
4 to 9 parts by weight of the polypropylene;
5 to 11 parts by weight of the polybutene;
15 to 22 parts by weight of the flame retardant; and
2 to 3 parts by weight of the ultraviolet absorbing agent.

14. The jacketed cable of claim 13,
wherein the poly(phenylene ether) is a poly(2,6-dimethyl-1,4-phenylene ether) having an intrinsic viscosity of 0.35 to 0.5 deciliter per gram;
wherein the 33 to 43 parts by weight of the hydrogenated block copolymer comprises 27 to 37 parts by weight of a polystyrene-poly(ethylene-butylene-styrene)-polystyrene tapered block copolymer;
wherein the composition comprises 0 to 5 parts by weight of any polyolefin other than the polypropylene and the polybutene;
wherein the flame retardant consists of the aluminum tris(diethyl phosphinate) and the melamine polyphosphate;
wherein in the bis(benzotriazole) compound structure, $R^1$ is hydrogen; and each occurrence of $R^2$ is independently $C_6$-$C_{10}$ alkyl;
wherein the composition further comprises 0 to 15 parts by weight of mineral oil and 0 to 15 parts by weight colorant; and
wherein the composition comprises 0 to 5 parts by weight total of any components other than the poly(phenylene ether), the hydrogenated block copolymer, the polypropylene, the polybutene, the flame retardant, the ultraviolet absorbing agent, the mineral oil, and the colorant.

* * * * *